April 30, 1968     W. J. KUDLATY     3,380,745
ROD SEAL
Filed Oct. 1, 1965
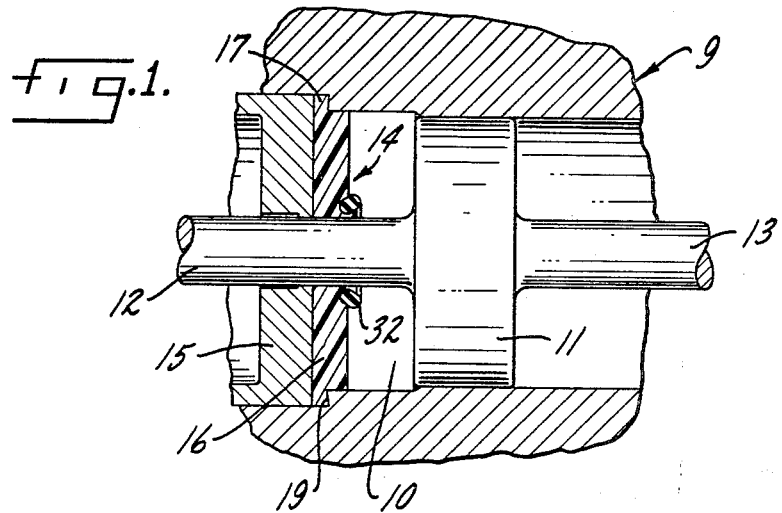
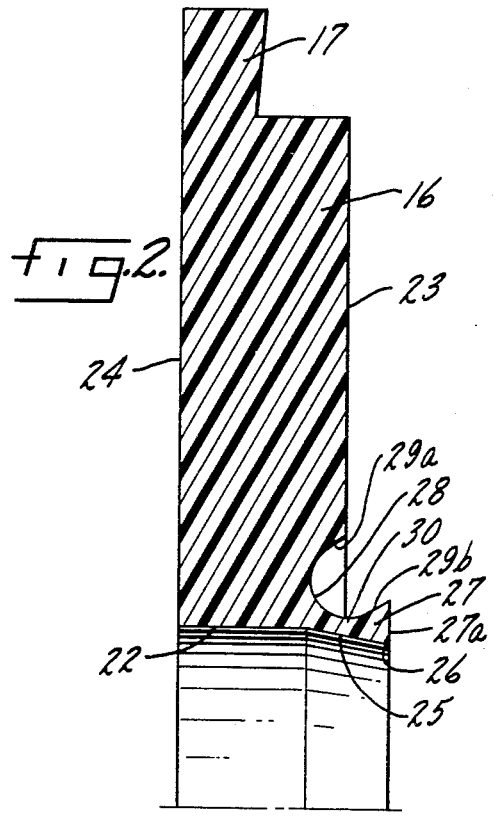
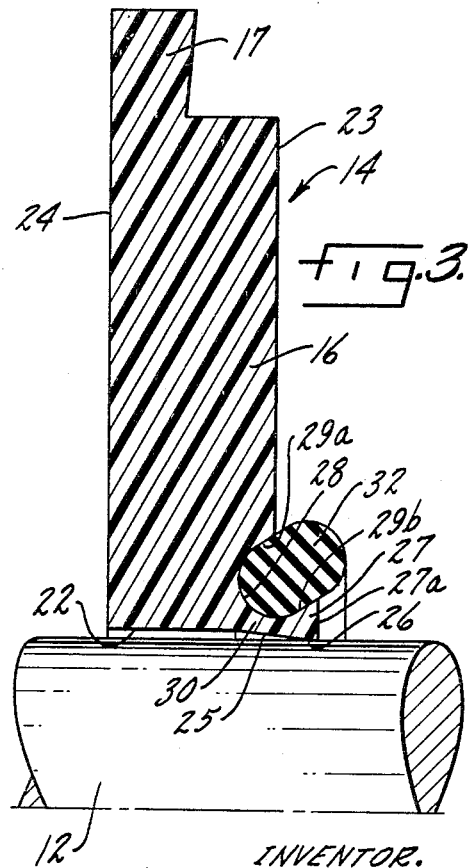
INVENTOR.
Walter J. Kudlaty,
BY Parker & Carter
Attorneys.

United States Patent Office 3,380,745
Patented Apr. 30, 1968

3,380,745
ROD SEAL
Walter J. Kudlaty, Elmhurst, Ill., assignor to Marvel Engineering Company, Chicago, Ill., a corporation of Delaware
Filed Oct. 1, 1965, Ser. No. 492,198
3 Claims. (Cl. 277—152)

ABSTRACT OF THE DISCLOSURE

A seal assembly for the piston rod end of a hydraulic cylinder including a flanged disk having one planar side for abutting the cylinder end wall, a second side adapted to face the piston, and a passage for the piston rod through the disk. The flange is adapted to be compressed between the cylinder body and the cylinder end wall to form a static seal therebetween. The passage for the piston rod has a clearance portion and a tapered portion forming an area of cross-section less than the piston rod at the end of the passage adjacent the second side. A groove is formed concentrically around the passage at the second side of the disk. An O ring is inserted into the groove to yieldingly urge the portion of the disk forming the reduced area of cross-section of the passage into dynamic sealing engagement with the piston rod. The groove is radially inwardly spaced from the chamber walls so that the O ring is not in contact with the chamber walls.

---

This invention is concerned with seals for hydraulic fluid systems and more particularly with seals for reciprocating rods.

An object of this invention is an effective seal for a reciprocating rod made from material that has a low coefficient of friction and little elastic response.

Another object is a seal of this nature that can be easily assembled.

Another object is a seal assembly that can be simply and economically manufactured.

Another object is a seal assembly that is impervious to a large variety of liquids.

Another object is to provide a shaft seal assembly effective to maintain sealing contact at all positions and movement of the sealed shaft.

Other objects may be found in the following specification, claims and drawings.

FIGURE 1 is a cross-section view of a seal assembly for a reciprocating rod;

FIGURE 2 is an enlarged view of an axial half section of the seal assembly of FIGURE 1 with the reciprocating rod removed; and FIGURE 3 is an enlarged partial view of an axial half section of the seal assembly of FIGURE 1 showing the seal assembly in sealing contact with the reciprocating rod.

Referring now to the drawings and especially to FIGURE 1, the numeral 9 indicates a hydraulic cylinder having an inner chamber 10 in which a piston 11 is mounted for reciprocal movement relative thereto. Attached to the piston are piston rods 12 and 13 which extend outwardly of the chamber. Piston rod 12 is shown extending through a seal assembly 14 and a chamber end wall 15. A similar seal assembly (not shown) may be provided for piston rod 13.

The seal assembly 14 includes a disc shaped bushing 16 made from a material having a low coefficient of friction and small elastic response. A material suitable for this use is the type of fluorinated ethylene-propylene resin sold under the trademark "Teflon." The bushing may be formed with a flange 17 extending around the perimeter thereof and adapted to engage a shoulder 19 cut in the cylinder 9. The end wall 15 of the chamber may be positioned to compress the flange against the shoulder to hold the disc shaped bushing in position in the cylinder.

A passage 22 adapted to receive the piston rod 12 is formed to extend through the seal assembly bushing 16 from the chamber side 23 of the bushing, which is exposed to the pressurized hydraulic fluid, to the opposite or outer side 24 of the bushing which abuts the end wall 15. A collar 27 is formed integrally with the bushing and coaxially with the passage to extend beyond the chamber side 23 thereof to surround the passage 22. As can best be seen in FIGURE 3, the diameter of the passage 22 throughout a major portion of its length, is greater than the diameter of the piston rod 12, but the passage tapers, as at 25, toward chamber 10 and its least diameter is less than that of the rod 12. This least diameter is located at the free end 27a of the collar. The piston rod 12 engages the tapered portion of the passage at 26 to form a liquid tight seal therewith to prevent the escape of hydraulic fluid from the chamber 10.

In order to give flexibility to the piston rod-engaging portion 26 of the bushing 16 to permit relatively free and unimpeded passage of the piston rod 12 during reciprocal movement thereof, an annular slot or groove 28 is cut in the face 23 of the bushing at the intersection of the face with the collar 27. The parallel walls 29a, 29b of the groove are inclined towards the passage 22 to undercut the collar, the flared wall 29b constituting the outer wall or surface of the collar 27. The forming of the groove 28 in this manner produces a collar of increased length having a weakened portion 30 about which the rod engaging portion 26 of the bushing can bend and flex radially and outwardly to permit reciprocal and limited lateral movement of the piston rod. While it is preferable to construct the flared wall to extend beyond the face of the bushing, it is not necessary that this be done and the collar could be formed so that it would not extend beyond the face of the bushing.

To hold the rod-contacting portion 26 of the tapered interior surface 25 of the passage 22 in fluid-sealing contact with the piston rod 12 during movement of the rod, a compressing member such as an O ring 32 is stretched into position in the groove. The O ring is made of a material more elastic than the "Teflon" bushing, for example of Buna N rubber, and has a smaller free diameter than the annular groove 28. Due to the inclination of the walls of the groove toward the passage and the use of an O ring having a smaller free diameter than the diameter of the groove, the O ring will exert a compressive force against the flared outer wall 29b of the collar 27 to force the rod contacting portion 26 of the tapered interior surface 25 against the piston rod. The compressive force of the O ring is directed toward the rod contacting tip or portion 26 of the tapered interior surface 25 of the passage to provide the sealing contact at the entrance to the passage 22.

The use, operation and function of the invention are as follows:

In systems utilizing hydraulic fluids, it is frequently necessary to provide seals for reciprocally moving parts such as piston rods. Because of the wide variety of fluids that may be used in such systems, it is desirable to provide a seal material that is non-reactive with most hydraulic fluids. The fluorinated ethylene-propylene resin sold under the trademark "Teflon" meets this requirement and additionally is desirable because it has a low coefficient of friction. However, "Teflon" has very little elastic response and maintaining seal with this material is difficult. This invention overcomes the lack of elastic response of "Teflon" resin and permits its use as a sealing material.

In the construction illustrated in the drawings, the seal assembly 14 is utilized to keep hydraulic fluid in a chamber 10 of a cylinder 9. The seal acts to prevent leakage of the fluid along a rod 12 which is connected to a piston 11 for reciprocal movement relative to the chamber and seal. The rod receiving passage 22 in the disc or bushing 16, is tapered at 25 so as to have a minimum diameter at the pressure side 23 of the disc with this minimum diameter being less than that of the piston rod 12. When the piston rod is inserted in this passage, it contacts the tapered interior surface 25 of the passage at 26 to provide a fluid-tight seal between the shaft and the disc 16. Since the piston rod is of greater cross-section than the end of the tapered portion of the passage, this tapered portion must give or move radially outwardly or the piston rod will bind in the passage. Because of the small elastic response of "Teflon," it is necessary to form the bushing so that the interior surface of the tapered portion can deflect outwardly. This is accomplished by providing an undercut or flared collar 27 around the tapered portion that can deflect radially.

To control the amount of radial deflection and to provide sealing pressure against the rod, a compression member such as an O ring 32 having a diameter less than the diameter of the groove 28 is positioned in the groove. Due to the inclination of the walls 29a and 29b of the groove, the O ring exerts pressure against the wall 29b that forms the flared outer wall of the collar to urge the outer portion 26 of the tapered surface 25 against the piston rod 12. Outward expansion of the collar compresses the O ring in the groove and expands it radially thus increasing the force exerted by the O ring against the collar. As the O ring exerts more force against the flared wall 29b of the collar, the tapered interior wall 25 is forced into greater contact at 26 with the piston rod. The flared wall 29b of the collar also functions to prevent accidental release of the O ring from the groove.

I claim:
1. A seal assembly for an end of a fluid cylinder of the type including a cylinder body having an inner cylindrical chamber, a piston in said chamber, an end wall closing said chamber and a piston rod extending from said piston through said end wall, said seal assembly including, in combination,
   a disk formed of a material having a low coefficient of fricton and small elastic response,
   said disk having an outer peripheral surface adapted to be received within said cylinder body and a radially extending peripheral flange adapted to be compressed between said end wall and said cylinder body to form a static seal therebetween and retain said disk,
   said disk having a first side adapted to abut said end wall and a second side adapted to face said piston,
   a passage formed in said disk between said first side and said second side for passage of said piston rod therethrough,
   said passage having a first portion adjacent said first side sized for clearance with said piston rod and a second portion tapered toward said second side to form an area of cross-section at the end of said passage adjacent said second side which is less than the cross-sectional area of the piston rod extending therethrough,
   an annular, generally axial groove extending into said disk from said second side, said groove being generally concentric with said passage and having an inclined inner and outer peripheral surface terminating at a position closely spaced to said passage to thereby form an annular collar about said tapered end of said passage which is connected to said disk by a thin-walled, flexible, annulus of material,
   an annular compression member adapted to seat in said groove and to yieldingly urge said collar into sealing engagement with said piston rod, with
   said groove being substantially radially spaced inwardly from said outer peripheral surface of said disk so that said annular compression member does not engage the cylinder walls.

2. The structure of claim 1 further characterized in that said collar extends axially beyond said second side.

3. The structure of claim 1 further characterized in that said annular compression member is an elastic O ring.

References Cited

UNITED STATES PATENTS

| | | | |
|---|---|---|---|
| 3,054,620 | 9/1962 | Schwing | 277—187 X |
| 3,057,630 | 10/1962 | Sneed | 277—165 |
| 3,190,702 | 6/1965 | Flick | 277—205 X |
| 3,210,086 | 10/1965 | Hudson et al. | 277—153 X |

SAMUEL ROTHBERG, *Primary Examiner.*